INVENTOR.
WENDELL S. SMITH
BY
Norman N. Holland
ATTORNEY

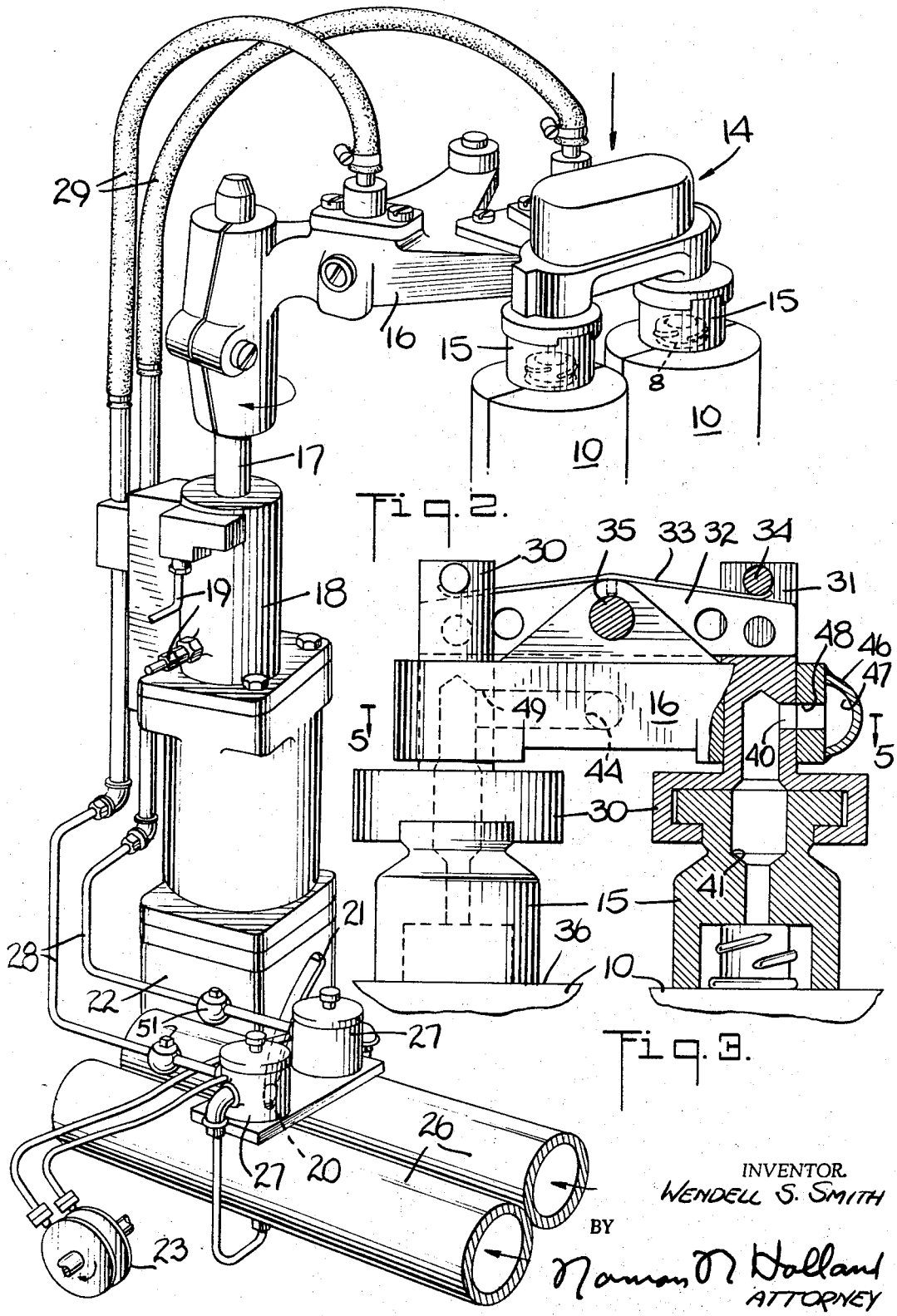

Sept. 24, 1968  W. S. SMITH  3,403,016
GLASSWARE FORMING APPARATUS WITH BLOW HEAD CONTROL
Filed April 15, 1965  3 Sheets-Sheet 3

INVENTOR.
WENDELL S. SMITH
BY
Norman N. Holland
ATTORNEY

United States Patent Office  3,403,016
Patented Sept. 24, 1968

3,403,016
GLASSWARE FORMING APPARATUS WITH
BLOW HEAD CONTROL
Wendell Stout Smith, Connellsville, Pa., assignor to Anchor Hocking Glass Corporation, Lancaster, Ohio, a corporation of Delaware
Filed Apr. 15, 1965, Ser. No. 448,501
4 Claims. (Cl. 65—261)

The present invention relates to the manufacture of glassware and more particularly to improvements in glassware forming machines having a blowing operation and of the type known in the industry as I.S. machines or similar machines.

In such machines and in a first operation, a parison forming means first receives a small charge or gob of molten glass and forms it into a partially shaped article called a parison by an initial pressing or blowing or combined pressing and blowing operation. This parison is then delivered to a blow mold wherein the final shaping is performed by a blow head which expands the parison within a hollow blow mold to the desired shape such as a bottle or vessel or other shaped glassware article.

In machines of this type the output capacity is determined by the speed of the part or portion having the lowest individual operating speed. While considerable increases have been made in the capacity of the machines so that they produce more articles of glassware per hour, it has now been found that an unexpected and significant increase in the machine capacity may be obtained by improvements in the blow head in accordance with the present invention.

While certain increases in speed have resulted in the use of two or more cavities in the blow molds, it is present practice to operate the blowing section with all cavities supplied by a common air supply and under a common pressure and blowing timing arrangement.

It has been found that the improved blowing system of the present invention increases machine output by as much as five percent or more. As will be more fully described below, the improvement reduces the time required for the blow molding step and since this step has in effect placed a limit on overall machine output, a significant improvement has resulted in the operating performance of the glassware forming machines.

Accordingly, an object of the present invention is to provide an improved glassware forming machine.

Another object of the present invention is to provide an increase in the output capacity of glassware forming machines.

Another object of the present invention is to provide an improved blow head for the blow mold stations of the glassware forming machines.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 2 is an enlarged perspective view of the blow head according to the present invention;

FIG. 3 is an enlarged detailed side elevational view partially in section of the blow head support arm with the top cover removed;

The operation of the blow head assembly will first be described generally with particular reference to FIG. 1.

Figure 1:
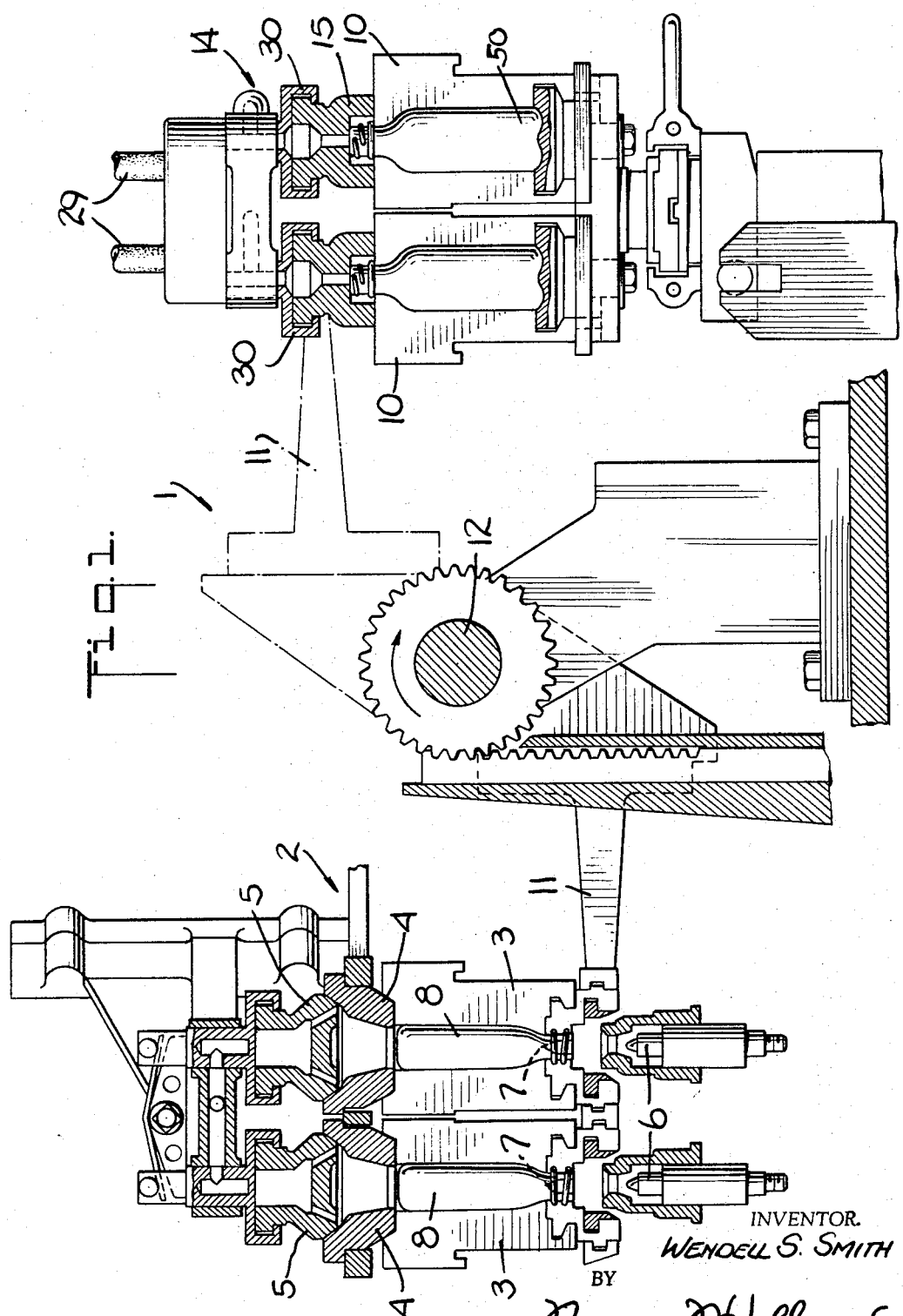
FIG. 1 is a vertical sectional view partially cut away showing the parison forming station and the blow molding station of an I.S. machine incorporating the improved blow head air supply system of the present invention.

FIG. 1 shows the cross-section of a glassware forming machine substantially of the basic type disclosed in Patent No. 1,911,119 which describes a glassware forming machine for forming hollow glass articles by various combinations. The general assembly of such a machine is now well-known and only so much of the machine will be described herein as to clarify the application of the present improvement to the blow head assembly of the machine and to indicate the improved operation which results from the practice of the invention.

It is clear that the improvements in the blow head assembly are also applicable to other glassware forming machines of this general type wherein partially formed glass articles such as parisons are inserted in hollow blow molds for a final shaping action by a blowing operation.

In the glassware forming machine 1 of FIG. 1, the parison forming station 2 is illustrated having two split parison body molds 3 shown in their closed position. A glass feeder has previously supplied a charge or gob of molten glass to the interior of the hollow parison molds 3 through a funnel and the parison forming operation has been completed through the combined operation of a pair of parison blow heads 5 positioned at the tops of the parison molds 3 to settle the glass charges in the molds 3 and on the neck pins or plunger 6 which form an initial cavity 7 in each parison 8.

The parison molds 3 are now opened and the completed parisons held by the neck rings 9 are transferred to the blow molds 10 located at the right hand side of the machine 1 by a swinging movement of the neck ring support arm 11 attached to the shaft 12. The parisons 8 are delivered to the hollow blow molds 10 by the neck rings 9 and the neck rings 9 are then opened and returned at the parison forming station 2 for the next cycle of the operation.

The blow head assembly 14 of the present invention is now lowered into position on molds 10 as illustrated in FIG. 1 to perform the final blowing operation.

The operation of the improved blow head assembly 14 and air control system will now be described.

Referring now to FIG. 2 the blow head assembly 14 is illustrated which includes a support and a supply system for the two blow heads 15.

A blow head support arm is raised and lowered on a shaft 17 by a suitable drive piston 18 having air inlets and outlets 19 and the radial position of the blow head arm 16 is controlled by a cam follower 20 on the shaft 17 operating in a suitable cam slot 21 in the hollow cam housing 22. The air control for the piston 18 as well as the various other driven elements is controlled by a synchronized timing device as described in the above referred to patent and including control cams as illustrated at 23 which will be further described below.

In the blowing operation at blow molds 10, air is forced into the parisons 8 through the blow heads 15 to cause the parisons 8 to expand as hollow articles such as the bottles (not shown) within the molds 10 having an outer shape conforming to the mold cavity and a wall thickness govererned by the volume of the glass charge used to form the parison 8. The air is supplied to the molds 10 through the blow heads 15 by a distribution system on the blowing head assembly. I have discovered that the time required for the blowing operation is a limiting factor in the output capacity of the forming machines and further that the blowing period is lengthened and the uniformity of the blow articles is also adversely effected by present air distribution systems.

The disadvantages are overcome by the individual air supply system and the related control for the system which will now be described.

I have also discovered that in using two or more molds or separate mold cavities at the parison forming and blow stations, the individual parisons may be subjected to slightly different conditions during parison forming and transfer. I have found that blow mold operations can be improved by providing individual timing and air pressure controls at the blow mold station for each mold cavity. This individual control has also improved output capabilities significantly as will now be described.

FIG. 2 illustrates separate air supply mains 26 adapted for connection to a suitable high output capacity source of compressed air. Individual control valves 27 for each of the blow molds 10 are positioned adjacent to the main 26 with one valve 27 connected to one main 26 and the other valve 27 connected to the other main 26. In this manner, the system controlled by one valve 27 is isolated from pressure drops in the main connected to the other valve 27. The outputs of valves 27 are connected to the blow head support arm 16 through suitable separate conduits 28 terminating in flexible hoses 29 which permit the necessary vertical and horizontal movement of the blow head arm 16 as it moves to and from the blow molds 10.

The delivery end of each of the hoses 29 is connected to a separate blow head 15 through separate air distributing conduits on the support arm 16. For a better appreciation of the location of the air distributing conduits on arm 16 and in the blow head the supporting structure for the blow heads 15 will now be described.

Referring to FIG. 3, each blow head 15 is mounted on the support arm 16 by means of holders 30. Each blow head holder 30 has an upright extension slotted at 31 which passes through the support arm 16. A rocker arm 32 pivotally mounted about a shaft 35 engages each upright within its slotted portion 31. By this arrangement the blow heads 15 may move vertically to fit tightly against the upper surfaces of the blow molds 10 during the blowing operation. Thus the blow heads 15 are accommodated to any minor variation in the levels of the tops of the blow molds 10. A spring 33 on top of the rocker arm 32 engages pins 34 for biasing the rocker arm into a level position.

It will be observed that the right hand portion of FIG. 3 has been sectioned to expose the interior air passages through the blow head assembly into the mold cavity. The blow head holder 30 has an air passage 40 which registers with air passage 41 in the blow head 15. Corresponding passages are shown in dash lines in the left hand side of FIG. 3. These passages of course supply air to the other mold 10. Now, the air passages between flexible hoses 29 (FIG. 2) and the blow heads 15 (FIG. 3) will now be described.

Figures 4, 5, 6:
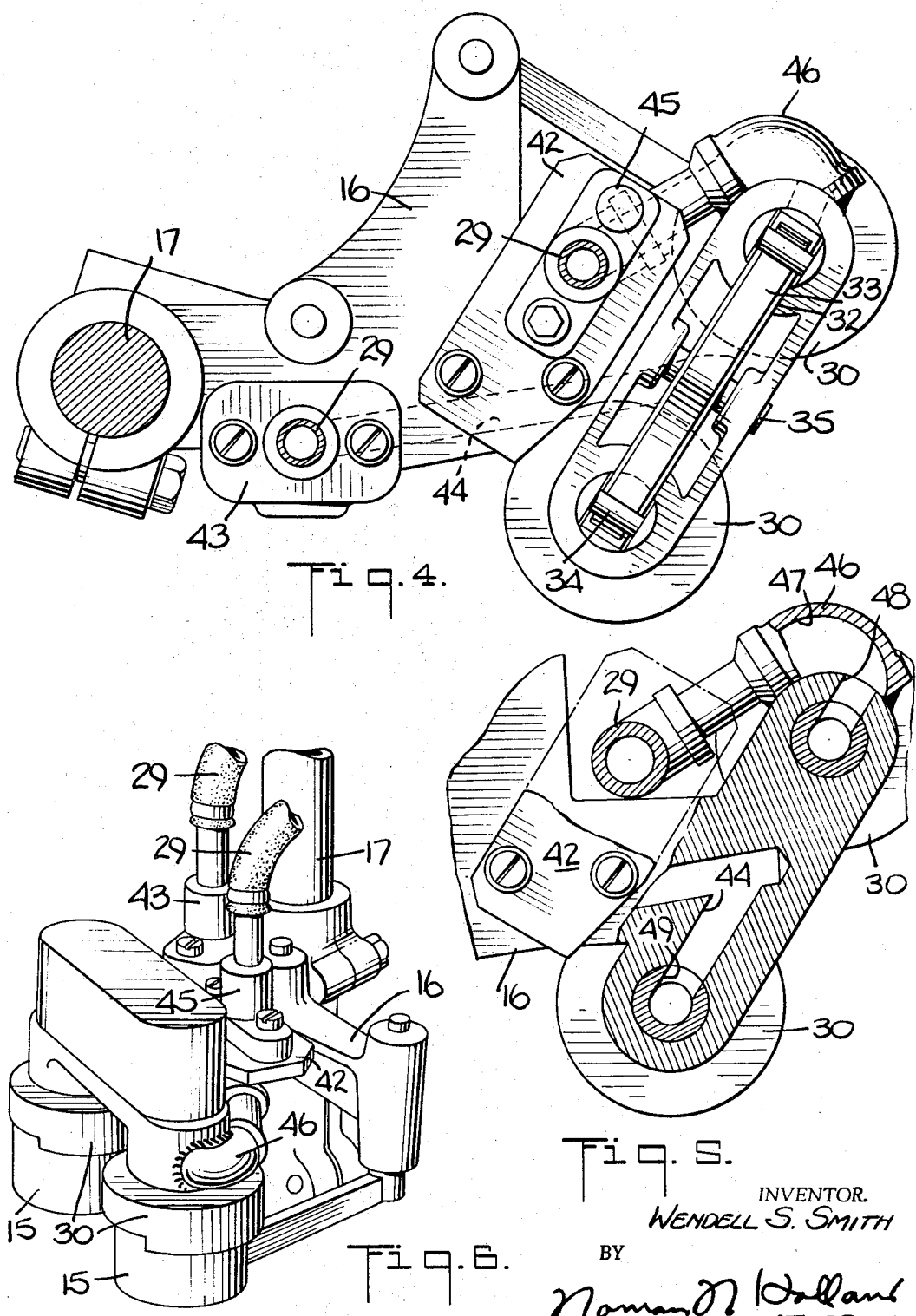
FIG. 4 is a top plan view of the blow head support arm.
FIG. 5 is a horizontal section view of the blow head holder taken along line 5—5 of FIG. 3.
FIG. 6 is a perspective view of the blow head assembly in accordance with the present invention.

As best illustrated in FIG. 6, one of the hoses 29 supplies air through fitting 43 to one blow head assembly. The corresponding interior passages are shown in FIGS. 4 and 5 and include fitting 43 and passages 44 and 49.

The other hose 29 (FIG. 4), provides air for the other blow head assembly through fitting 45 and passages 47 and 48. Where the support arm 16 has originally included only a single supply conduit 44 for one or more blow heads, this added conduit 47 is conveniently provided by mounting a second hose fitting 45 on a suitable mounting plate 42. While the added conduit 47 may be bored internally of the arm 16, it is convenient to add an outer tube 46 as shown in FIGS. 3 thru 6.

By providing separate passages for air to flow into the mold cavity applicant has increased the productivity of glass blowing machinery by approximately 5%. It is believed that the separate air supply systems for each mold cavity results in improved internal cooling action of the glassware. The glass sets faster and shortens the duration of this portion of the machine operation. As a result, it is now possible to produce more articles of glassware in each cycle of the glass forming machine.

In addition, separate air systems for each mold minimizes pressure losses during each blowing operation. That is, when one mold is losing air pressure it does not draw air from its companion mold. This result also serves to reduce the duration of the blowing operation In operation the blow head assembly 14 (FIG. 1) moves through its regular vertical and rotary motions to move the blow heads 15 into blowing position when the parisons 8 have been delivered to the blow molds 10. The blow head assembly 14 is removed from the blow molds 10 after the blowing operation to permit removal of the completed glassware articles such as the bottles 50 as illustrated.

As illustrated in FIG. 2, air flow to the molds 10 is controlled by the machine cam system 23 and control valves 27. The rotating cams 23 are part of a group which synchronize the entire operation of the glass forming machine. The cams open valves 27 for a pre-determined period for the blowing operation. Individual pressure regulators and flow control valves may be used as illustrated at 51.

It will be seen that applicant has provided an improvement which increases the capacity of glass blowing machines. By providing separate air systems for two or more mold cavities, pressure losses and time delays are reduced. Further the improved system in addition to increasing capacity provides better quality control of blown glassware.

As various changes may be made in the form construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a glass making machine for forming blown glass articles and having a blow mold with a plurality of blowing cavities and having a plurality of individual blowheads and means for moving a blowhead into registry with each mold cavity and having means for delivering a glass parison to each cavity in the blow mold for being blown into a glass article the improvement which comprises, a plurality of separate sources of gas under pressure, separate conduits connecting each of said blowheads with a separate one of said sources of gas, a cut-off valve in each of said conduits for stopping and starting a puff of blowing gas in the connected blowing cavity, a cut-off valve operating means including an individual timer for each of said cut-off valves whereby the duration of the blowing puff for the parison in each cavity is individually controlled, and a separate pressure regulator and gas volume flow control valve in each of said conduits for individually controlling the gas pressure and gas flow for the blowing puff for the parison in each cavity.

2. The glass making machine as recited in claim 1 in which said moving means for said blowheads comprises a drive motor including a drive piston for raising and lowering said blowheads and a cam slot and cooperating cam follower coupled to said piston for turning the piston on its axis and moving the blowheads over the mold cavities.

3. The glass making machine as claimed in claim 1 in which said separate sources of gas comprise sources of compressed air.

4. The glass making machine as claimed in claim 1 wherein said individual timers comprise rotating cams.

References Cited

UNITED STATES PATENTS

| 2,065,504 | 12/1936 | Beck | 65—261 XR |
| 2,702,444 | 2/1955 | Rowe | 65—235 XR |
| 3,137,560 | 6/1964 | Ketcham | 65—267 XR |
| 3,163,263 | 12/1964 | Irwin et al. | 65—264 XR |

DONALL H. SYLVESTER, *Primary Examiner.*

F. W. MIGA, *Assistant Examiner.*